UNITED STATES PATENT OFFICE.

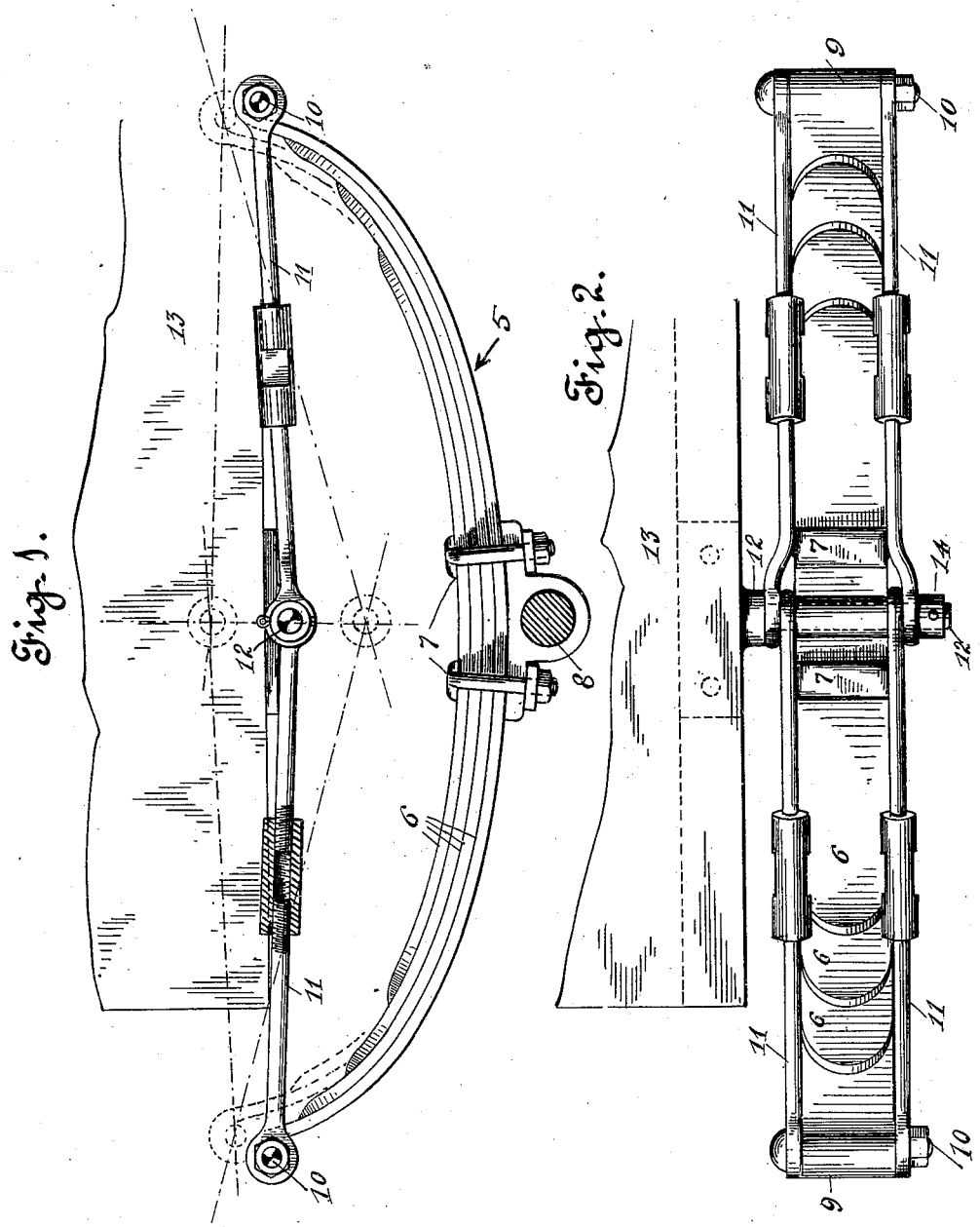

NICHOLAS LUXEMBOURGER, OF SANTA ANA, CALIFORNIA, ASSIGNOR TO BOW SHOCK ABSORBING SPRING COMPANY, OF LOS ANGELES, CALIFORNIA, A CORPORATION OF CALIFORNIA.

SHOCK-ABSORBING VEHICLE-SPRING.

979,016. Specification of Letters Patent. Patented Dec. 20, 1910.

Application filed May 29, 1909. Serial No. 499,188.

*To all whom it may concern:*

Be it known that I, NICHOLAS LUXEMBOURGER, a citizen of the United States, residing at Santa Ana, in the county of Orange and State of California, have invented new and useful Improvements in Shock-Absorbing Vehicle-Springs, of which the following is a specification.

My invention has relation more particularly to a vehicle spring designed to absorb sudden shocks or jars occasioned to a vehicle by reason of its rapid passage over rough and uneven surfaces, and a main object thereof is to provide a novel form of spring suspension, whereby a cushioning effect is obtained on an upward as well as a downward movement of the vehicle body.

Another object is to provide a spring suspension that will eliminate sudden longitudinal shocks or jars occasioned by the sudden stoppage of the vehicle.

A further object is to provide a spring whose tension may instantly be increased or diminished as occasion demands.

I accomplish the above objects by means of the spring described herein and illustrated in the accompanying drawings, in which:—

Figure 1— is a side elevation of my improved spring illustrating the method of suspension on a vehicle. Fig. 2— is a plan view of the spring as illustrated in Fig. 1.

Heretofore the cushioning effect of vehicle supporting springs of the usual type has been in a downward vertical direction only, no provision being made for cushioning when the body or frame of the vehicle moves in an upward direction. By means of my improved spring and novel suspension means, all shocks occasioned a vehicle body coming in either a vertical or longitudinal direction are provided for, thus obviating the necessity of providing additional shock absorbing mechanisms.

In a practical embodiment of my invention, 5 designates a half elliptic spring formed of a plurality of leaves 6 placed together the reverse of the usual leaf springs, the shortest leaf forming the upper face. The spring 5 is secured by the usual clips 7 to an axle bearing 8, and its lower leaf terminates at either end in an eye bearing 9. Pivotally mounted on bolts 10 that are journaled in bearings 9 are a plurality of suspension or connecting rods 11, a pair being secured to each pair of bearings 9. These rods extend inwardly toward each other, and their ends are pivotally secured to a rod or bearing 12 rigidly secured to the under face and projecting beyond the sides of the vehicle body 13, a nut 14 maintaining them from transverse movement. The weight of the vehicle body inclines the rods downwardly from their point of connection to the spring to their point of pivoted attachment with bearing pin 12 on the vehicle body. Each rod is preferably divided at the center thereof, turn buckles of usual type connecting the ends, and permitting an adjustment of the tension of the spring.

It will be apparent that by pivotally connecting the ends of the spring through the medium of the suspension rods to a single pivotal point on the vehicle body, I am enabled to obtain the maximum cushioning efficiency of the spring to its fullest extent, any upward movement of the body 13 occasioned by sudden shocks to the vehicle exerting a central pull on the connecting rods or radius rods 11, and forcing the ends of the springs inwardly toward each other. A similar inward movement occurs upon a depression of the body, as clearly indicated in Fig. 1 of the drawings. Any lateral strains or shocks are also provided for by this suspension arrangement. It will also be observed that by pivotally attaching the spring at one point to the vehicle body that any shock or jars that it may be subjected to will cause the body to oscillate above or below its normal resting position corresponding to the position illustrated in the drawings, the ends of the springs being always drawn together, thus utilizing to the fullest extent the entire tension of the spring.

Attention is called to the fact that in the normal position of the body the axes of all the pivotal connections are substantially in alinement, and attention is also called to the fact that the forces acting in the rods 11 are always tensile forces.

Having described my invention what I claim as new and desire to secure by Letters Patent is:—

1. In combination, an axle, bow-springs mounted on said axle, a wagon body arranged between said bow-springs and adapted to move into the space between said springs when said body is depressed, radius rods attached to the ends of said springs and pivotally attached to the sides of said body, the point of attachment of said springs to said body being in line with the point of connection between said radius rods and said springs, whereby an upward or downward movement of said body will flex said bow-springs.

2. In combination, an axle, bow-springs supported on said axle, a wagon body mounted between said springs and adapted to move into the space between said springs when said body is depressed, laterally projecting pins mounted on the sides of said body, radius rods pivotally attached to the ends of said springs and pivotally attached to said pins, said pins being normally in line with the pivotal connections between said radius rods and said springs, whereby an upward or downward movement of said body will flex said springs.

In witness that I claim the foregoing I have hereunto subscribed my name this 20th day of May, 1909.

NICHOLAS LUXEMBOURGER.

Witnesses:
EDMUND A. STRAUSE,
MYRTLE A. PALMER.